United States Patent [19]
Cieslak et al.

[11] Patent Number: 5,402,416
[45] Date of Patent: Mar. 28, 1995

[54] METHOD AND SYSTEM FOR BUFFER OCCUPANCY REDUCTION IN PACKET SWITCH NETWORK

[75] Inventors: Randall A. Cieslak, Scarsdale; Christos J. Georgiou, White Plains; Chung-Sheng Li, Ossining, all of N.Y.

[73] Assignee: International Business Machines Corporation, Armonk, N.Y.

[21] Appl. No.: 177,873

[22] Filed: Jan. 5, 1994

[51] Int. Cl.⁶ .......................................... H04L 12/56
[52] U.S. Cl. ..................................... 370/60; 370/68.1
[58] Field of Search ....................... 370/58.3, 60, 60.1, 370/68.1, 94.1, 103, 108; 375/106, 109

[56] References Cited

U.S. PATENT DOCUMENTS

| | | | |
|---|---|---|---|
| 4,616,359 | 10/1986 | Fontenot | 370/60 |
| 4,899,333 | 2/1990 | Roediger | 370/60 |
| 4,969,149 | 11/1990 | Killat et al. | 370/60 |
| 5,050,162 | 9/1991 | Golestani | 370/60 |
| 5,063,562 | 11/1991 | Barzilai et al. | 370/94.1 |
| 5,199,028 | 3/1993 | Arnold | 370/60 |
| 5,218,680 | 6/1993 | Farrell et al. | 395/325 |
| 5,276,677 | 1/1994 | Ramamurthy et al. | 370/68.1 |

OTHER PUBLICATIONS

Stallings, William, Ph. D, "Packet Switching", *Data And Computer Communications*, Third Edition, pp. 283–330, (1991).

Newman, P., "Backward Explicit Congestion Notification for ATM Local Area Networks", IEEE, pp. 719–723, 1993.

Nagle, John B., "On Packet Switches with Infinite Storage", IEEE Transactions on Communications, vol. Com-35, No. 4, pp. 435–438, Apr. 1987.

Mukherjee et al., "Dynamic Time Windows and Generalized Virtual Clock Combined Closed-Loop-/Open-Loop Congestion Control", IEEE, pp. 0322–0332, 1992.

Gallassi et al., "ATM: Bandwidth Assignment and Bandwidth Enforcement Policies", IEEE, pp. 1788–1793, 1989.

*Primary Examiner*—Benedict V. Safourek
*Attorney, Agent, or Firm*—Heslin & Rothenberg

[57] ABSTRACT

A packet switch system having a buffer occupancy reduction mechanism for controlling data flow through switched nodes of the system to avoid congestion and reduce required buffer storage at the nodes. For an isochronous connection, buffers are initially allocated at each switching node connection to ensure listless transmission of packets. A buffer occupancy trace for the connection is recorded and the delay time of an isochronous packet at a particular switch port is returned to a preceding switch port. The preceding switch port employs the feedback message to delay subsequent packets through the connection to reduce the queuing time at the particular switch port. Once the isochronous connection has stabilized, buffer reallocation is performed wherein a scheduler at each switch node along the connection attempts to combine buffer allocations for different isochronous connections. This occurs provided the corresponding buffer occupancy traces of the isochronous connections do not overlap. Buffer occupancy reduction is therefore accomplished through the delaying of isochronous packets propagated through the connections of the packet switch system and the reallocating of buffers initially assigned to two or more isochronous connections.

27 Claims, 7 Drawing Sheets

METHOD AND SYSTEM FOR BUFFER OCCUPANCY REDUCTION IN PACKET SWITCH NETWORK

TECHNICAL FIELD

This invention relates to packet switch systems or networks and particularly to a method of controlling data flow through switched nodes of such systems to avoid congestion and reduce requirements for buffer storage at such nodes. The invention specifically pertains to a novel feedback mechanism for phase adjusting a stream of data packets and a buffer allocation process to reduce congestion and buffer storage requirements at the switching nodes of an isochronous connection within a packet switch system.

BACKGROUND OF THE INVENTION

A packet switch network is a data network containing intelligent switching nodes, and has the following general characteristics: (1) prior to transmission, each data message is segmented into short blocks of specified maximum length, and each block is provided with a header containing addressing and sequencing information (each packet becomes the information field of a transmission at the link protocol level which usually contains error control capabilities); (2) because of their size, packets can be passed very quickly from switching node to switching node; and (3) the switching nodes do not archive the data, rather messages are generally "forgotten" by the sending node as soon as a next node checks for errors (i.e., if required), and acknowledges receipt.

Communication circuits which may be shared in such packet networks include transmission lines, program controlled processors, ports or links, and data or packet buffers. In large multinode networks, each node or packet switch accommodates many paths or links and terminates such paths which may extend to user terminal equipment or to other nodes of the network. A node may include one or more processors for controlling the routing and processing of packets through the node. The node is customarily equipped with a large number of buffers for storing packets in anticipation of such routing or awaiting availability of an output link. Each connection between nodes or extending to end users, typically serves a plurality of concurrent connections or sessions between a plurality of calling parties or machine terminals.

Depending on the situation, packet switching can offer several advantages over other data communication techniques; including: (1) for data applications in which the amount of traffic between terminals cannot justify a dedicated circuit, packet switching may be more economical than transmission over private lines; (2) for applications in which data communication sessions are shorter than a minimal chargeable time unit for a telephone call, packet switching may be more economical than dialed data; (3) because destination data information is inherently part of the packet, a large number of messages may be sent to many different destinations as fast as a source data terminal can issue them (depending on the type of packet service being used, there may not be any connection time delay between transmitting packets containing actual data); and (4) because of intelligence built into the network, dynamic routing of data is possible. Each packet travels over the route established by the network as the best available path for the packet at the time of the connection. This characteristic can be used to maximize efficiency and minimize congestion.

One problem in large packet communication or packet switching systems arises when many users attempt to utilize the network at the same time. This results in the formation of many paths or circuits for routing the data; and, resultingly, the communication facilities become congested and/or unavailable to a user or to the user's packet when it is being forwarded through the network. It has been found that congestion tends to spread through a network if uncontrolled. As a result, a number of flow control procedures, such as end-to-end windowing and link-by-link watermark flow controls, have been developed and commercially exploited.

A principal area of packet congestion is in buffers (or queues) of each switch node, particularly where the buffers become unavailable to store incoming packets. One solution to a buffer congestion problem is to halt all incoming traffic on all incoming lines to the affected node when the packet buffers become filled, or congested, and no buffer is available for storing additional incoming packets.

The simple end-to-end windowing scheme for flow control has advantageous properties when viewed strictly from the network periphery. Each machine can have many sessions simultaneously established between itself and various other machines. For each of these sessions (referred to as logical channels), a given machine is allowed to have 'p' unacknowledged packets outstanding in the network, where 'p' is some fixed integer chosen large enough to allow uninterrupted transmission when the network is lightly loaded. The greater the end-to-end network delay, the larger 'p' must be. For example, a machine can initially transmit 'p' packets into the network as fast as it desires; but it then can transmit no more packets (on that particular logical channel) until it has received an acknowledgement from the destination machine for at least one of those outstanding packets.

This scheme has several desirable properties. There is very little wasted bandwidth caused by the flow-controlling mechanism, because the number of bits in an acknowledgement can be made very small compared to the number of bits in the 'p' packets to which it refers. There is also an automatic throttling that occurs under heavy load that divides network capacity fairly among all traffic sources. Finally, it provides automatic speed conversion between machines of different data rate because, for example, a destination can regulate the rate at which it acknowledges packets so that it will not be overwhelmed by too much data from an over-eager source.

A disadvantage of a pure windowing scheme is that it may frequently require an unacceptably large amount of buffer storage within a particular packet switch. To insure no loss of data, it is necessary to provide, at each buffer, or queue, in the network 'cxp' packets of storage either (1) for every source whose packets might transmit to that queue, or (2) for every destination whose packets might be fed by that queue, where 'c' is the maximum number of sessions that a source or destination is allowed to have simultaneously in progress. Since some buffers, or queues, may be positioned in such a way that they are fed by a large number of sources, or that they feed a large number of destinations, the amount of queuing required can be impractically large, especially if the packets contain more than just a few bytes.

Flow control utilizing a link-by-link watermark principle enables each node to keep track of its own queue length, and sends a "stop-sending" message upstream whenever the queue length exceeds some preestablished upper threshold. As soon as the queue length drops below a preestablished lower threshold, a "resume-sending" message is sent back upstream. The advantage of this scheme is that it is insensitive to the number and type of sources, and it results in the smallest possible queue requirements (because the delay between the sending of a stop-data message and the actual cessation of transmission is minimal). However, each node must know how many links feed each of its queues, and must be able to generate and send the "stop-sending" and "resume-sending" messages out on the appropriate links. Deadlocking is also a potential problem.

Illustratively, suppose that the next packet in a queue of a given node is destined for a downstream node B, and suppose that node B has sent node A a "stop-sending" message. Node A typically has links to many other nodes besides node B, and there may well be many packets in node A's queue destined for those other nodes. If node A's queue is implemented with a simple hardware FIFO, the blocked packet at the front of the queue will also block all subsequent packets in the queue, even though their respective outgoing links are available. In the extreme case where node B dies, node A can be indefinitely tied up; and the blockage can ripple upstream with the result that the failure of a single node can incapacitate a large portion of the network.

An isochronous source such as an audio or video source generates data packet as a fixed or nearly fixed rate. An isochronous receiver usually expects to receive a data packet within certain timing constraints, i.e., it has to arrive at the destination within a timing window. Otherwise, a buffer overflow or underflow condition will occur at the playback buffer, resulting in the loss of audio or video signals. Therefore, an isochronous connection usually has to maintain certain timing characteristics to ensure the appropriate delivery of each data packet.

Thus, a novel approach to avoiding buffer congestion is desired, particularly such an approach which allows an enhanced number of isochronous connections to be established through a switching node having a fixed amount of buffer capacity.

DISCLOSURE OF THE INVENTION

Briefly summarized, the present invention comprises in a first aspect a method for processing an isochronous connection established within a multinode packet switch network. The network has at least two isochronous connections through a common switch port each of which provides a stream of packets to the switch port. The streams of packets are propagated at a same nearly constant packet rate $1/T_{frame}$ into the switch port. The processing method includes the steps of: monitoring buffer occupancy time of a current packet provided to the common switch port by a first isochronous connection; returning a feedback message along the first isochronous connection to a previous switch node of the multinode packet switch network, the feedback message being representative of the monitored buffer occupancy time; and adjusting at the previous switch node the packet phase of subsequent packets relative to the nearly constant packet rate $1/T_{frame}$ of the stream of packets propagating through the first isochronous connection to the common switch port such that once delivered to the switch port, buffer occupancy time for the subsequent packets is reduced in comparison with the monitored buffer occupancy time of the current packet.

In another aspect, a method for reducing buffer occupancy time of packets delivered to a node in a packet switch network is presented. The packet switch network has an isochronous connection established through a first node and a second node such that a stream of packets is delivered from the first node to the second node at a nearly constant packet rate, $1/T_{frame}$, and packet phase. The method includes the steps of: monitoring buffer occupancy time at the second node of a current packet of the stream of packets delivered from the first node to the second node; generating at the second node a feedback message representative of the monitored buffer occupancy time; sending the feedback message back along the isochronous connection to the first node; and adjusting at the first node the packet phase of subsequent packets of the stream of packets relative to the nearly constant packet rate $1/T_{frame}$ such that once delivered to the second node, buffer occupancy time for the subsequent packets is reduced in comparison with the monitored buffer occupancy time.

As still another aspect, a method for processing at least two isochronous connections of a multinode packet switch network is presented. A first isochronous connection and a second isochronous connection share a common switch port at a switched node of the multinode packet switch network. The isochronous connections provide a stream of packets to the common switch port with each stream of packets having the same nearly constant packet rate, $1/T_{frame}$, and an independent packet phase. A predefined, unique buffer allocation at the common switch port is assumed. The processing method includes the steps of: evaluating buffer occupancy time relative to the packet rate $1/T_{frame}$ of at least one packet in the stream of packets provided by the first isochronous connection and evaluating buffer occupancy time relative to the packet rate $1/T_{frame}$ of at least one packet of the stream of packets provided by the second isochronous connection; and combining buffer allocations for the first isochronous and the second isochronous connection such that the isochronous connections share a buffer at the common switch node provided that there is no overlap in evaluated buffer occupancy times.

Packet switch systems implementing the above-outlined method aspects are also described and claimed herein.

To restate, a feedback mechanism is presented to reduce the average buffer occupancy for isochronous traffic in a packet switch network, and thereby increase overall switch throughput. Enhanced performance is obtained without requiring global synchronization. This is particularly important as the frequency of operation of communication systems continues to increase and the ability to globally synchronize remains limited. The approach presented minimizes buffering of packets once launched into the packet switch network and thereby reduces the amount of unpredictable delay within the network. Further, by combining buffer allocations of different isochronous connections, a packet switch network can accommodate a greater number of isochronous connections without requiring commensurate increase in buffering capacity.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Isochronous traffic with a nearly constant packet rate, $1/T_{frame}$, such as real time speech or video, imposes a stringent requirement on delivery time at a destination node of a connection in a packet switch network. The problem has typically been resolved by using various bandwidth reservation and flow control schemes. However, as noted, these schemes often carry a significant packet loss probability.

Pursuant to the invention, in order to provide for lossless delivery of packets for isochronous traffic, sufficient buffer(s) at each switching node is(are) initially preassigned or allocated to each isochronous connection. Thus, if there are multiple isochronous connections multiplexed through a receiving common port, at least one buffer is initially required for each isochronous connection, regardless of the bandwidth requirements. Obviously, with such an approach the maximum number of isochronous connections that can be established through the port is limited by the number of buffers available at the port. The problem could be especially acute where there are many isochronous circuits passing through a common port, with each connection using only a small fraction of the link bandwidth. The invention addresses this problem by providing certain novel feedback and buffer allocation processings.

Figure 1:
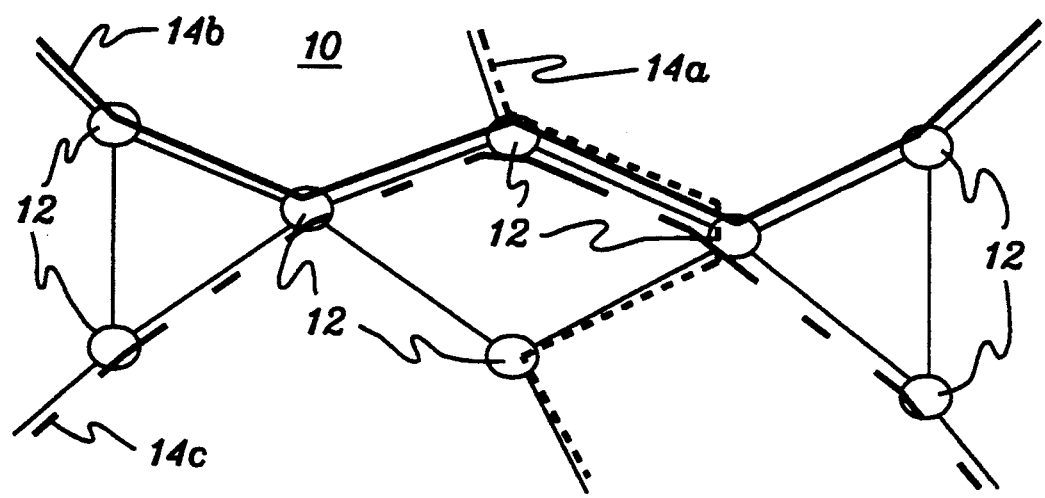
FIG. 1 illustrates a packet switch network segment wherein three isochronous connections share several common switching nodes.

Referring to the drawings, FIG. 1 illustrates a packet switch system, or network, 10 having multiple switching nodes 12 each of which is assumed to include multiple input ports and output ports. Three isochronous connections exist within packet switch system 10, and switching nodes 12 are arranged in multiple switching stages. Specifically, connections 14a, 14b & 14c are each assumed to propagate a respective stream of packets through the switching stages, for example, from left to right. The switching nodes, which are common to all three connections 14a, 14b & 14c, are particularly sensitive to the number of packets and the extent of packet grouping within each stream of packets crossing the respective isochronous connections.

Figure 2:
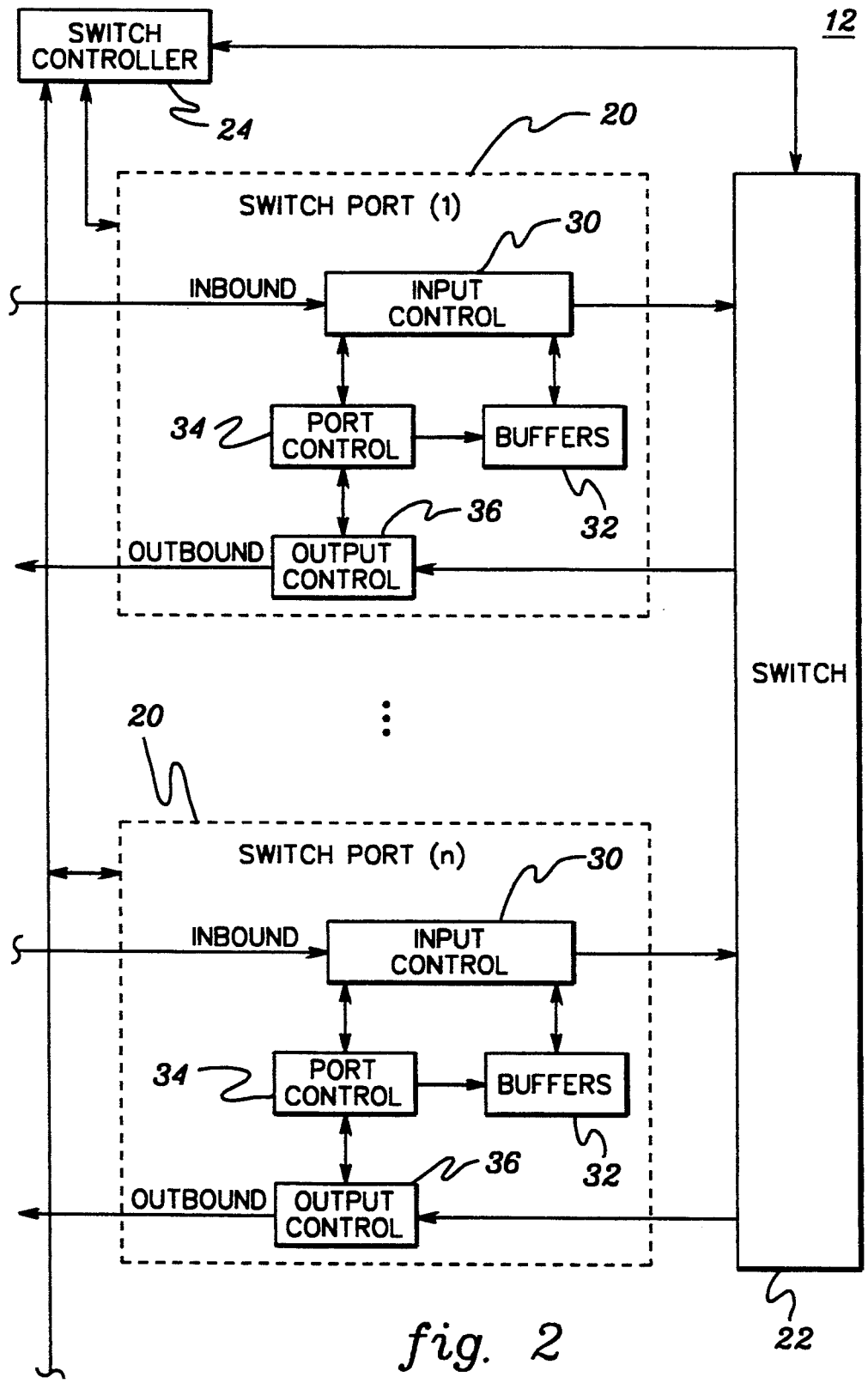
FIG. 2 is a block diagram of one embodiment of a switching node of a packet switch network.

FIG. 2 depicts one switching node 12 embodiment. Node 12 includes multiple switch ports 20, labeled SWITCH PORT (1) . . . SWITCH PORT (n). Each switch port 20 that is coupled to a prior or upstream node in the network can receive data packets on a single inbound line and provide feedback packets on a single outbound line. Alternatively, each switch port 20 that is coupled to a next or downstream node in the network can receive feedback packets on its single inbound line and provide data packets on its single outbound line. Thus, each switch port functions either as a receiving (or input) port or as a sending (or output) port for data packets, and for feedback packets.

Switching node 12 intelligence resides partially within a switch controller 24 which monitors the state of operation of the various isochronous connections established through switch ports of the node. Switch controller 24 communicates with each switch port 20 and intercepts header information associated with the data packets comprising the stream of packets delivered through an isochronous connection, such as connections 14a, 14b, 14c(FIG. 1). Control protocol for switch controller 24 is discussed in the available literature and generally known by one of ordinary skill in the art. A single switch 22, such as a crossbar switch, routes data from a receiving switch port to the associated departing switch port for a particular connection, i.e., switch controller 24 determines the appropriate settings for switch 22.

As shown, each inbound line connects to an input control 30 within a respective switch port 20. If presently undeliverable, control 30 will temporarily store a received data packet in one of a plurality of buffers, or queues, 32. This buffering of packets in queues 32 is overseen by a port control 34. When a packet can be delivered, port control 34 directs retrieval of a stored packet from buffers 32, through input control 30, for transfer to switch 22. Switch 22 then forwards the packet to an output control 36 of a sending switch port 20, which comprises a different switch port than the receiving switch port. Once provided to an output control, the packet is immediately delivered to the corresponding outbound line 36. Pursuant to the invention, buffer occupancy timing information on selected packets of a stream of packets is maintained in a buffer occupancy trace table (discussed further below).

Figure 3:
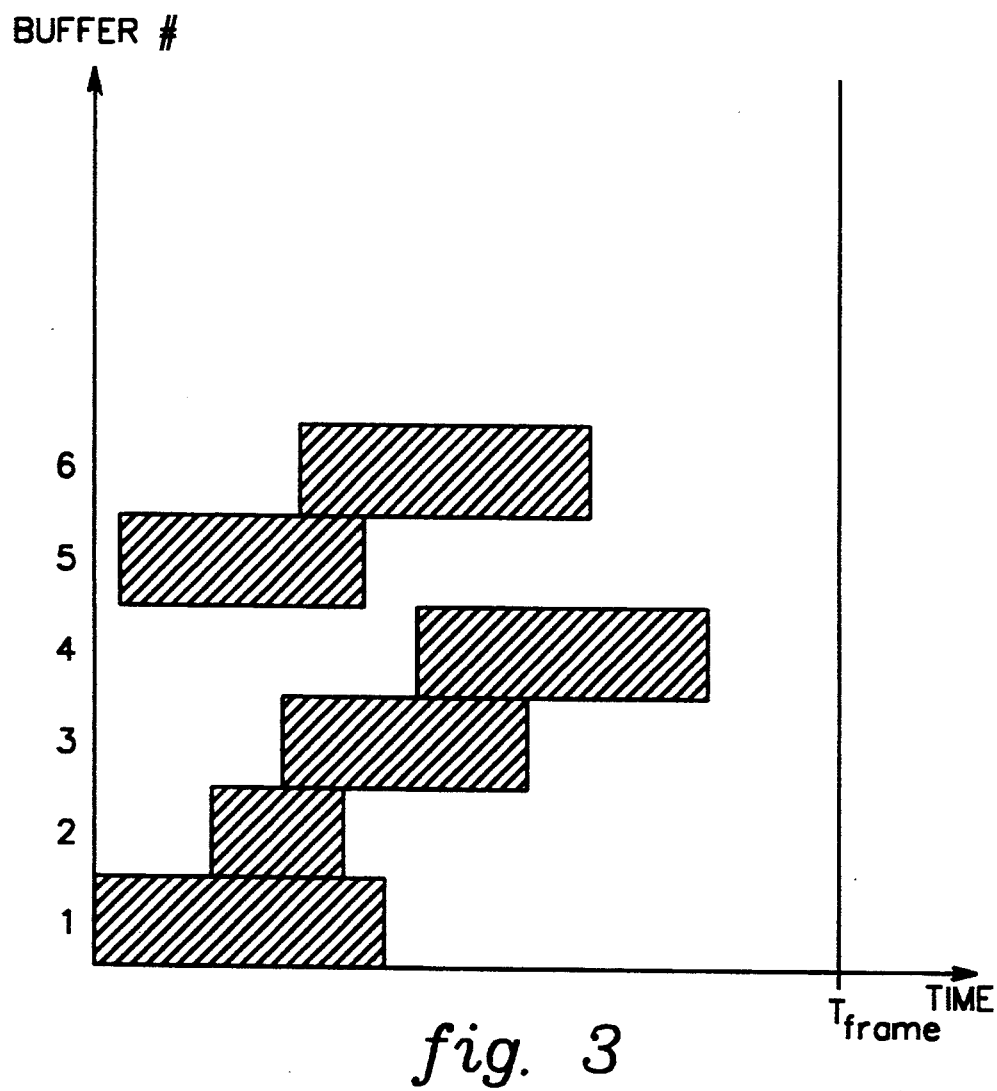
FIG. 3 illustrates buffer occupancy traces (or timings) for six packets held in six buffers of a receiving switch port in a switch node of a packet switch network.

Again, each connection is assumed to support periodic isochronous traffic having a frame time $T_{frame}$. The buffer occupancy trace of FIG. 3 is comparable to a "snap shot" of six buffer locations of a single switch port 20 (FIG. 2) for a given time frame $T_{frame}$.

Figure 4A:
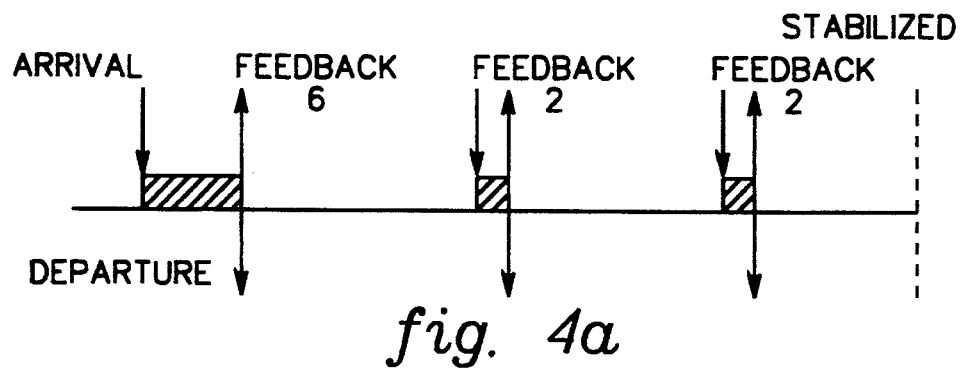
FIG. 4a is a timing diagram illustrating the effect on buffer occupancy of a feedback control mechanism in accordance with the present invention.

FIG. 4a is a sample timing diagram of buffer occupancy for successive data packets of an isochronous connection. Buffer occupancy is measured from an arrival time to a departure time, with time being plotted along the horizontal axis. Pursuant to the invention, a feedback message is transmitted from a receiving switch node to a source switch node along the receiving switch node's outbound line. In the left most buffer occupancy trace, the feedback message is arbitrarily shown to comprise six time intervals of a time frame $T_{frame}$. This feedback signal is defined to correspond to the buffer occupancy time of a current packet at the receiving switch port.

In accordance with the invention, the feedback message is employed by the source switch node (not shown) to delay, if possible, the delivery time of subsequent isochronous packets of the corresponding isochronous connection by an amount equal to or less than the buffer occupancy time to which the feedback signal corresponds. Such delivery time delaying is equivalent to adjusting the phase of the subsequent packets relative to the nearly constant interarrival time frame $T_{frame}$. By delaying transmission of subsequent packets, the buffer occupancy of a next illustrated packet is shown reduced. In the example of FIG. 4a, buffer occupancy is reduced to a third of its previous value for the middle and right most buffer occupancy traces. Again, a buffer occupancy trace is obtained by noting the arrival time and the departure time of a packet in a buffer of a given switch port.

Figure 4B:
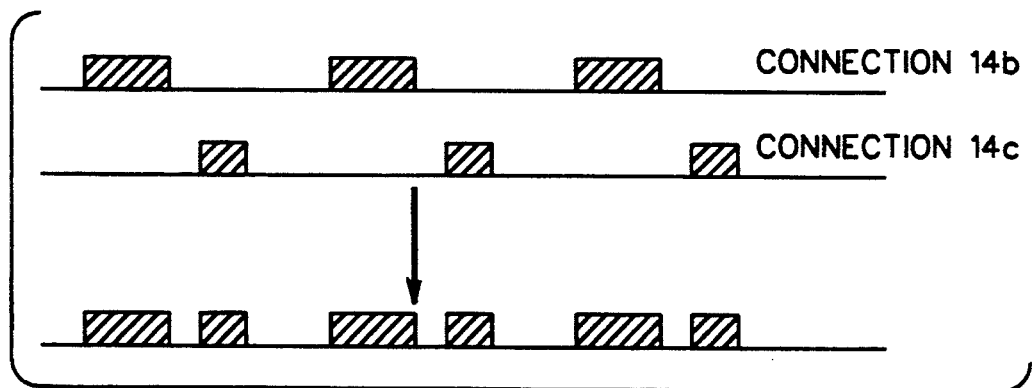
FIG. 4b is a timing diagram which illustrates buffer allocation combining in accordance with the present invention.

A buffer occupancy trace for connection 14b and a buffer occupancy trace for connection 14c are shown by way of example in FIG. 4b. Either or both of the traces for connections 14b & 14c could have been modified as a result of the feedback message processing summarized above and discussed further below. Since there is no overlap in buffer occupancy times, these two isochronous connections can share the same buffer location as shown. The result is that the effective buffer allocation of a specific isochronous connection is reduced. Preferably, the combining process occurs after a stabilization message has been received by the switching node and the isochronous circuit through the switch port itself has stabilized subsequent to buffer occupancy reduction processing. This is discussed further below.

Processing in accordance with the invention is next described in somewhat greater detail. The goal of the feedback mechanism presented is to support buffer sharing among isochronous connections and thus improve the ability of a particular switching node to handle a greater number of isochronous connections. Several assumptions are made concerning the subject packet switch system.

Specifically, each switch port is assumed to be operating with the same basic scheduling unit, $T_{slot}$. Transmission of an isochronous packet occupies an integer multiple of the scheduling unit, $T_{slot}$ and all the isochronous connections have the same interarrival time $T_{frame}$ for their packets, where:

$$T_{frame} = N_{slot} T_{slot}.$$

Therefore each frame consists of $N_{slot}$ time slots. An isochronous connection requiring a K/N link bandwidth thus occupies K time slots of the interarrival time $T_{frame}$. Within each switch port there exists a "scheduler" which allocates fixed time slots in each frame for each isochronous connection. Connection admission is a separate algorithm which controls buffer allocation for packet delivery.

Isochronous packet processing in accordance with the invention employs the following data structures:
1. Buffer occupancy trace (for each connection and buffer), includes: a connection identification, packet arrival time, and packet delivery time.
2. For each connection: a status (stable, unstable); previous packet arrival time; and a current packet arrival time.
3. For each connection and input port: a scheduled arrival time of a next packet; and a scheduled departing time of a next packet.
4. For each connection and output port: a scheduled arrival time of a next packet; and a scheduled departing time of a next packet.
5. Feedback message: a connection identification; and a buffer delay time $T_{delay}$.
6. Stabilization message: a connection identification.

Figure 5:
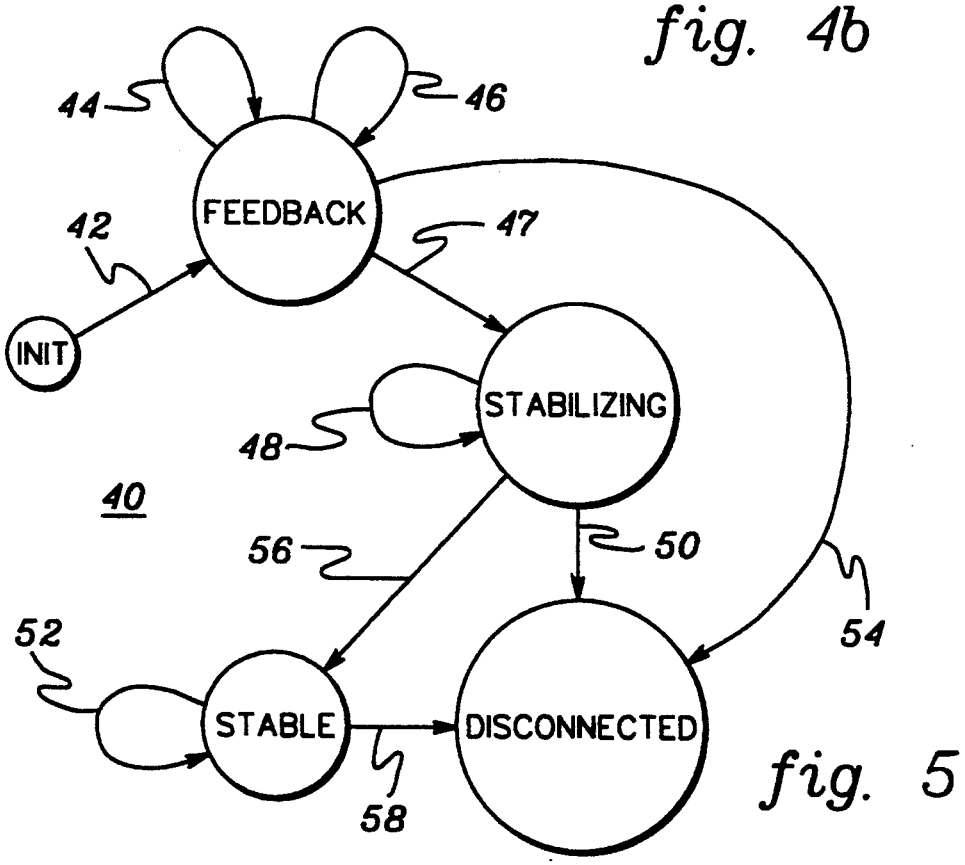
FIG. 5 is a finite state machine for feedback control processing in accordance with the invention.
Figure 6:
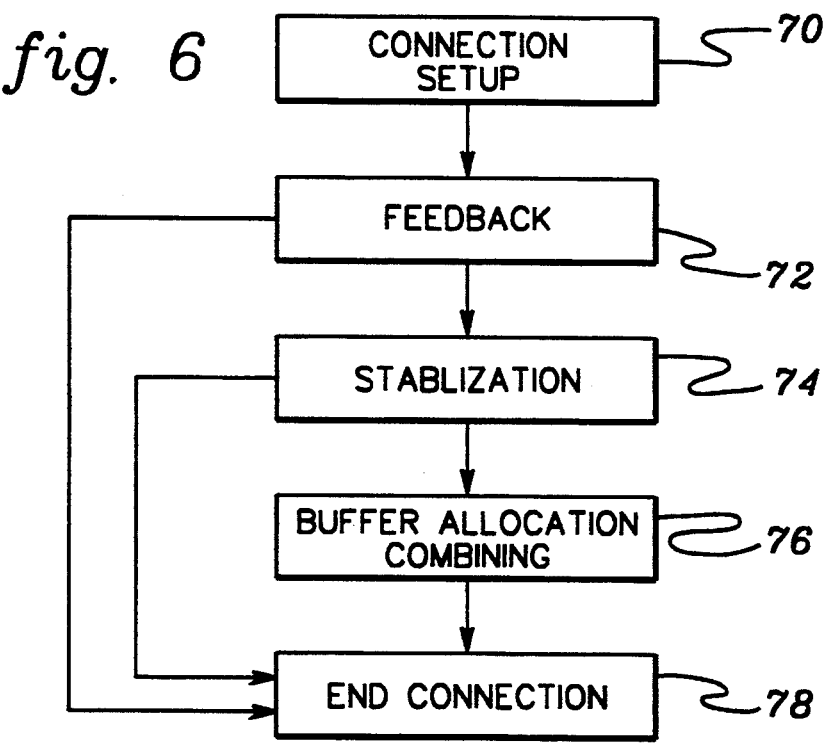
FIG. 6 is a flowchart of one overview embodiment of feedback control processing in accordance with the invention.

As an overview, the processing of the invention is introduced with reference to a finite state machine 40 depicted in FIG. 5. In the following description, a single "connection" is considered. The states of the finite state machine are as follows:
INIT—the initial state of a connection between two end nodes;
FEEDBACK—the state of a connection that is not yet stable;
STABILIZING—the state of a connection that has received a stable message, but has not yet become stable; and
STABLE—the state of a connection that is stable.
DISCONNECTED—the state of a connection that is terminated, with buffer allocations and corresponding connection tables erased.

Processings of the transitions of finite state machine 40 are set forth below.

Transition 42 occurs with receipt of a packet when in the INIT state. The function includes:
1. Attaching a buffer to the isochronous connection such that the buffer is not shared with another isochronous connection;
2. Scheduling "delivery time" as soon as possible after packet "arrival time" (i.e., the packet is delivered from an input port to an output port as soon as that output port is available);
3. Initializing the buffer occupancy tracer to reflect the packet "arrival time" and scheduled "delivery time" within the packet frame; and
4. Entering FEEDBACK state. While in the FEEDBACK state, the input port receives a "feedback message" from a downline (or downstream) switch port. The feedback message includes parameters which identify the isochronous connection and $T_{delay}$. This message essentially comprises a nonbinding request for the sending switch node (i.e., switch port) to delay delivery of subsequent packets. Since the feedback message is asynchronous to the interarrival time $T_{frame}$ of the isochronous connection, the subsequent packets may not necessarily be the next packets in the stream of packets through the connection.

Transition 44 includes the following steps.
1. Check with the output switch port to see if the schedule can be modified. To accomplish this, the algorithm requires that the connection schedule table at the output port and the buffer occupancy table at the input port be checked. At the sending switch port, the connection scheduling table is examined for other connections that would conflict with the present connection if the present connection's delivery time was delayed. Let $T_1$ be the maximum amount that the connection delivery time can be delayed without conflict with other connection delivery times. Check the buffer occupancy table at the input port for other connections that would conflict with the same buffer if the connection's delivery time were delayed. Let $T_2$ be the maximum amount that the connection delivery time can be delayed without conflict with other buffer occupancy traces. If $T_3 = \min(T_1, T_2) > 0$, proceed to the next step. Otherwise, ignore the "feedback message".

2. If the delivery schedule can be modified at the sending node, delay the scheduled delivery time by an amount $T_D = \min(T_3, T_{delay})$.

Transition 46 occurs when a packet arrives at the input port while the connection is in the FEEDBACK state. The steps are as follows:
1. Transmit the packet at its scheduled delivery time; and
2. Once the packet is transmitted, continue as follows:
   i. update the buffer occupancy trace (which could have changed due to a change in the arrival time of a current packet); and
   ii. send a feedback message to the upstream node of the isochronous connection with the parameter $T_{delay}$ derived from the buffer occupancy trace.

Transition 47 processing is performed when the input port receives a "stable message" while in the FEEDBACK state. The steps are:
1. enter the STABILIZING state;
2. reset the "stabilizing min counter" to 0; and
3. reset the "stabilizing max counter" to 0.

Next, transition 48 or transition 56 occurs when the input port receives a packet while in the STABILIZING state. Occurrence of transition 48 or transition 56 depends on the values of the stabilizing min and max counters. The implemented steps are:
1. transmit the packet at its scheduled delivery time;
2. after transmitting the packet:
   i. update the buffer occupancy trace, and
   ii. send a "feedback message" to the upstream node of the isochronous connection with the parameter $T_{delay}$ set to the size of the buffer occupancy trace;
3. increment the "stabilizing max counter";
4. if the value of the stabilizing max counter is $> N_{max}$, enter into the STABLE state, set the buffer occupancy for this connection to the entire period, action is complete; otherwise, continue with step 5;
5. compute $D = |T_{delay}(i) - T_{delay}(i-1)|$;
6. if $D < \epsilon$, then increment the "stabilizing min counter", and continue processing; otherwise, reset the "stabilizing min counter" to '0' action is finished;
7. if the "stabilizing min counter" $> N_{min}$, then action is complete; otherwise, continue processing;
8. enter the STABLE state; and
9. the allocated buffer is reassigned to multiple isochronous connections. This is done only to the extent that the buffer occupancy traces do not overlap. In order to handle variation in packet arrival times, the buffer occupancy traces can be artificially increased at the arrival end. In this way, occasionally delayed packets will not disrupt the algorithm.

Transition 52 is an action performed when the input port receives a packet while in the STABLE state. The process involves delivering the packet according to the connection scheduling table.

Finally, transitions 50, 54, and 58 are performed when the input port receives a disconnect report from the action originator while in either the FEEDBACK state, the STABILIZING state, or the STABLE state. The steps are:
1. remove the entry from the buffer occupancy trace table at the input port and the connection scheduling table at the output port; and
2. using the port buffer allocator, reassign buffers to connections so that buffers can be used by different connections. This is done in such a way that buffer occupancy traces cannot overlap. Again, in order to handle variations in packet arrivals, the buffer occupancy can be artificially increased at the arrival end.

Processing steps in accordance with one embodiment of the present invention are next presented in still greater detail with reference to the flowcharts of FIGS. 6–10. An overview of the processing is set forth in FIG. 6.

Figure 7:
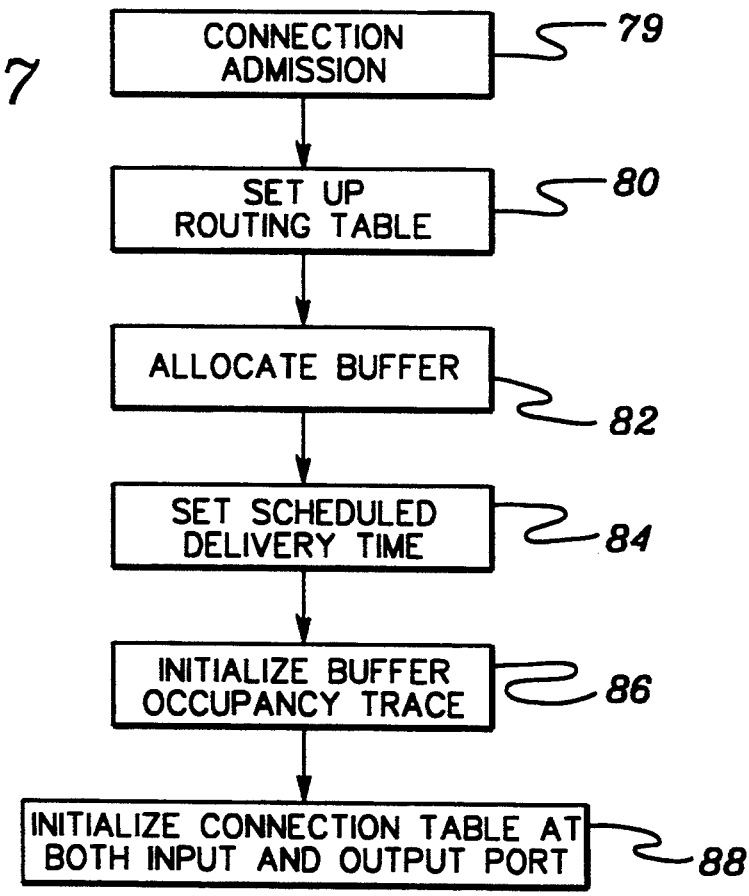
FIG. 7 is a flowchart of one embodiment of the connection setup function of the processing of FIG. 6.

Prior to transmission of any data packets, an isochronous connection is set up, 70 "Connection Setup." One embodiment of connection setup in accordance with the invention is set forth in FIG. 7. Buffer occupancy evaluation and feedback message processing then occurs, 72 "Feedback," which is followed by stabilization analysis in accordance with the invention, 74 "Stabilization." Embodiments of feedback and stabilization processings are presented in FIGS. 8a, 8b and 9, respectively. After stabilizing, buffer allocations are evaluated for combining, 76 "Buffer Allocation Combining," one embodiment of which is presented in FIG. 10. After combining buffer allocations, disconnect processing as described above is performed, 78 "End Connection." Alternatively, processing can jump to the disconnect function from the feedback state or the stabilization state as described above.

In the processing embodiment of FIG. 7, connection set up begins with conventional connection admission, 79 "Connection Admission." Connection admission is a separate algorithm which guarantees adequate buffer allocation for substantially lossless packet delivery. Essentially, the step inquires into whether the network has sufficient bandwidth to allow a current isochronous connection to be established. An appropriate control packet in the stream packets initiates the connection admission. As the control packet propagates through the packet switch network, a routing table is initialized at each switching node, 80 "Setup Routing Table." One embodiment of a routing table is shown in Table 1.

TABLE 1

| connection_id | imput port_id | output port_id |
|---|---|---|
| 0 | i = 3 | 0 |
| 1 | i = 3 | 2 |
| 5 | i = 3 | 1 |
| 7 | i = 3 | 2 |
| 8 | i = 3 | 2 |
| 9 | i = 3 | 7 |
| 11 | i = 3 | 9 |

The routing table is set up in each port control of each port switch along the established isochronous connection. One or more buffers are allocated at each port switch along the isochronous connection based upon the bandwidth of the particular connection, 82 "Allocate Buffer." Again, allocation of buffer occurs with propagation of an initial control packet(s) along the established connection path through the packet switch network.

With delivery of an initial data packet of the stream of packets, actual delivery time at each switch node is recorded as a scheduled delivery time, 84 "Set Scheduled Delivery Time." The assumption is that the delivery time of each packet (herein referred to as the "packet phase") within the interarrival time frame $T_{arrival}$ is substantially fixed. A time stamp $T_{arrival}$ is associated with the arrival of a first bite of an isochronous packet, 86 "Initialize Buffer Occupancy Trace." One embodiment of a buffer occupancy trace table in accordance with the present invention is set forth as Table 2.

TABLE 2

| buffer_id | start | end |
|---|---|---|
| buffer_id = 0 | $t_{01}$ | $t_{02}$ |
| connection_id = 1 | $t_{03}$ | $t_{04}$ |
| connection_id = 3 | | |
| buffer_id = 1 | $t_{05}$ | $t_{06}$ |
| connection_id = 4 | | |
| buffer_id = 2 | $t_{07}$ | $t_{08}$ |
| connection_id = 5 | | |
| . | . | . |
| . | . | . |

The buffer occupancy time $T_{delay}$ of each packet is calculated such that:

$$T_{delay} = T_{delivery} - T_{arrival}.$$

$T_{delivery}$ is the time that the first byte of a packet is sent out of the buffer. Finally, connection tables are initialized at both the input port and the output port of each switch port through which the connection is established, 88 "Initialize Connection Table At Both Input And Output Port." Examples of connection tables for the input port and output port of the switch ports are presented in Tables 3 & 4. The queuing time 'q' of a particular connection is synonymous with the buffer occupancy time.

TABLE 3

| Connection_id | Previous Queuing Time | Arrival time of Current Packet |
|---|---|---|
| 2 | $q_2$ | $t_2$ |
| 4 | $q_4$ | $t_4$ |
| 5 | $q_5$ | $t_5$ |
| 7 | $q_7$ | $t_7$ |

TABLE 4

| Connection_id | Scheduled Next Delivery Time |
|---|---|
| 2 | $t_2$ |
| 4 | $t_4$ |
| 5 | $t_5$ |
| 7 | $t_7$ |
| . | . |
| . | . |

Figure 8A:
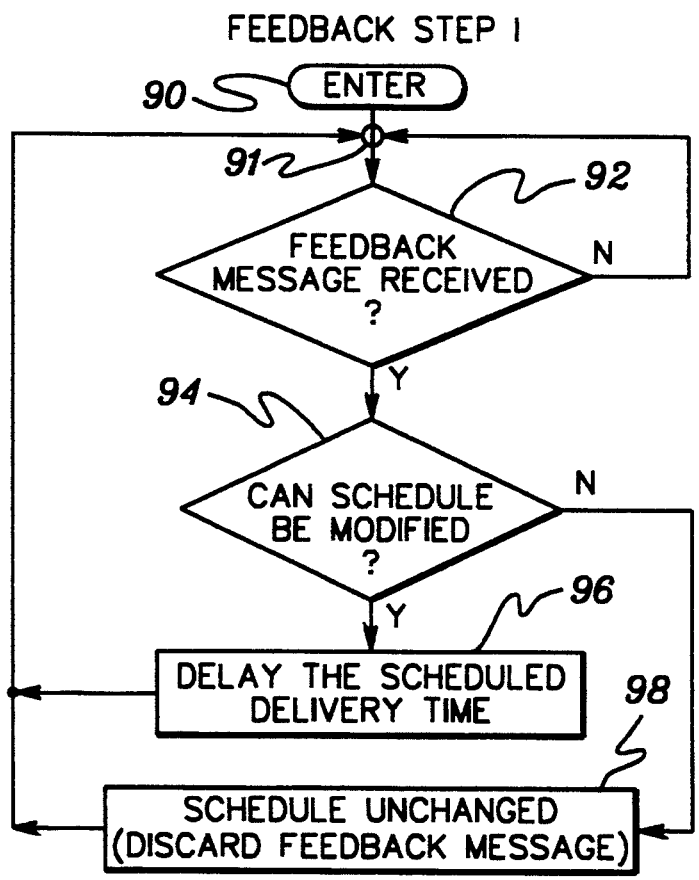
FIGS. 8a & 8b are flowcharts of one embodiment of the feedback control function of the processing of FIG. 6.

FIG. 8a presents one embodiment of a portion of the feedback processing in accordance with the invention. This portion of the feedback routine is labeled 'STEP 1' and is implemented at the sending switch port in a switching node of the packet switch network through which an isochronous connection is established. When in the feedback state, a feedback message is generated at each switch port for every isochronous packet transmitted. The feedback message is propagated back along the path of the isochronous packet to the preceding switching node (if there are cascaded switches involved) or to a host originating the isochronous connection (if this is the first switching node in the path). Processing begins, 90 "Enter," with inquiry into whether a feedback message has been received from a downstream switching node, 92 "Feedback Message Received?" If "No," then flow remains idle and loops back to junction 91 and hence inquiry 92. Upon receiving a feedback message, the present switch port determines whether the packet delivery schedule can be modified, 94 "Can Schedule Be Modified?" Inquiry 94 includes checking the connection table at the corresponding output port and the buffer occupancy trace at the input port. Assuming that the schedule can be modified, then the scheduled delivery time is delayed, 96 "Delay The Scheduled Delivery Time." The switch port delays the delivery time of subsequent isochronous packets of the corresponding isochronous connection by an amount equal to the maximum allowable delay '$T_d$' such that:

1. $T_d < T_{delay}$, and
2. The transmission of a next isochronous packet using the new schedule (i.e., delaying by $T_d$) does not interfere with earlier transmission commitments for other isochronous connections.

After delaying a scheduled delivery time, return is made to junction 91 and hence inquiry 92 to await a next feedback message. Again, when in the FEEDBACK state, a feedback message is propagated backwards from each switching node with forward propagation of each packet of the stream of packets in a connection. This process continues until a stabilizing state is reached as described below. If the schedule cannot be modified upon receipt of a feedback message, then (from inquiry 94) processing discards the feedback message, 98 "Schedule Unchanged (Discard Feedback Message)." Thereafter, flow returns to junction 91 to await a next feedback message. Note that it is possible that an isochronous frame could be delayed less than $T_{delay}$ because of prior commitments of a particular switch port to other isochronous connections.

Figure 8B:
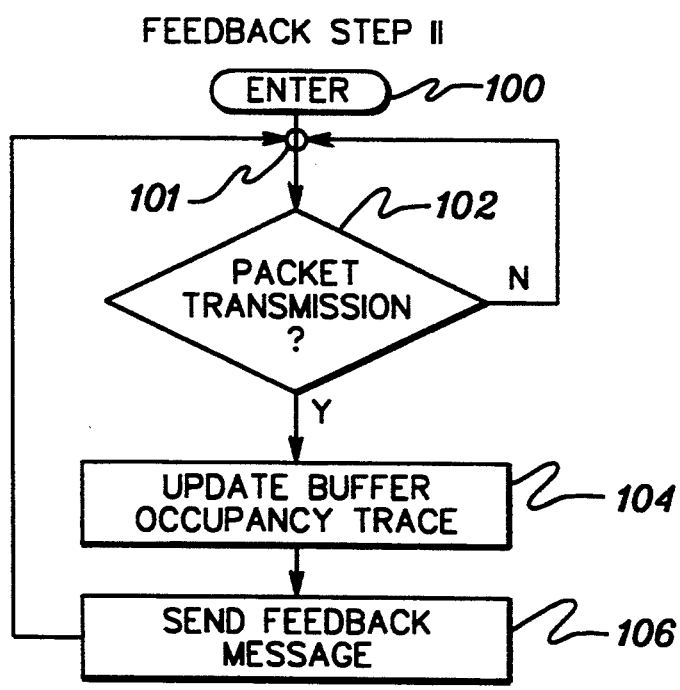

FIG. 8b presents related feedback processing which occurs at the receiving switch port, i.e., the switch port propagating a feedback message back to a sending switch port. Processing begins, 100 "Enter," by inquiring whether a packet has been received, 102 "Packet Transmission?" If "No," then processing loops back to junction 101 and essentially remains idle at this inquiry. Once a packet is transmitted, the buffer occupancy trace at the input port is updated, 104 "Update Buffer Occupancy Trace," and the corresponding feedback message is generated and transmitted back to the sending switch port, 106 "Send Feedback Message." After sending the feedback message, processing returns to junction 101 and hence inquiry 102. Note that since each intermediate switch port in an isochronous connection functions as either a receiving port or a sending port, the processing of FIGS. 8a & 8b occurs at each switch node, only at different switch ports of the node.

Figure 9:
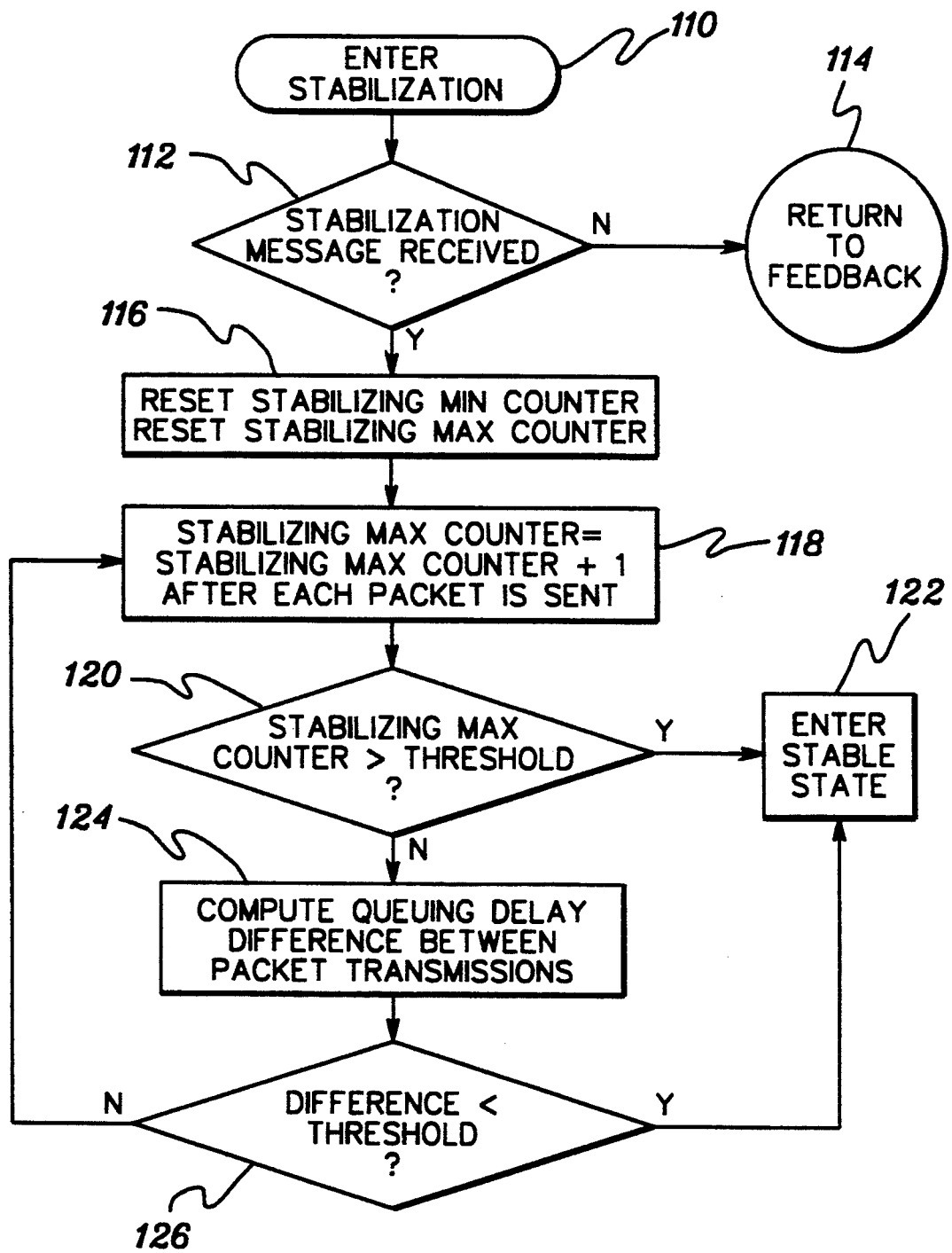
FIG. 9 is a flowchart of one embodiment of the stabilization function of the processing of FIG. 6.

FIG. 9 presents one embodiment of processing occurring during a stabilization state. Processing begins, 110 "Enter Stabilization," by considering whether a stabilization message has been received from a downstream switch node, 112 "Stabilization Message Received?" If "No," then processing remains in the feedback state, 114 "Return To Feedback." A message indicating stabilization has been achieved is initiated by the destination node of an isochronous connection as soon as the isochronous connection is set up. The stabilization message is sent along a reverse path of the isochronous circuit. Any intermediate switch nodes will forward the message only if the corresponding queuing delay fluctuation of the isochronous connection is smaller than a predefined value $\epsilon$. Alternatively, stabilization can be declared after a certain number of packets have been considered subsequent to receipt of a stabilization message.

Figure 10:
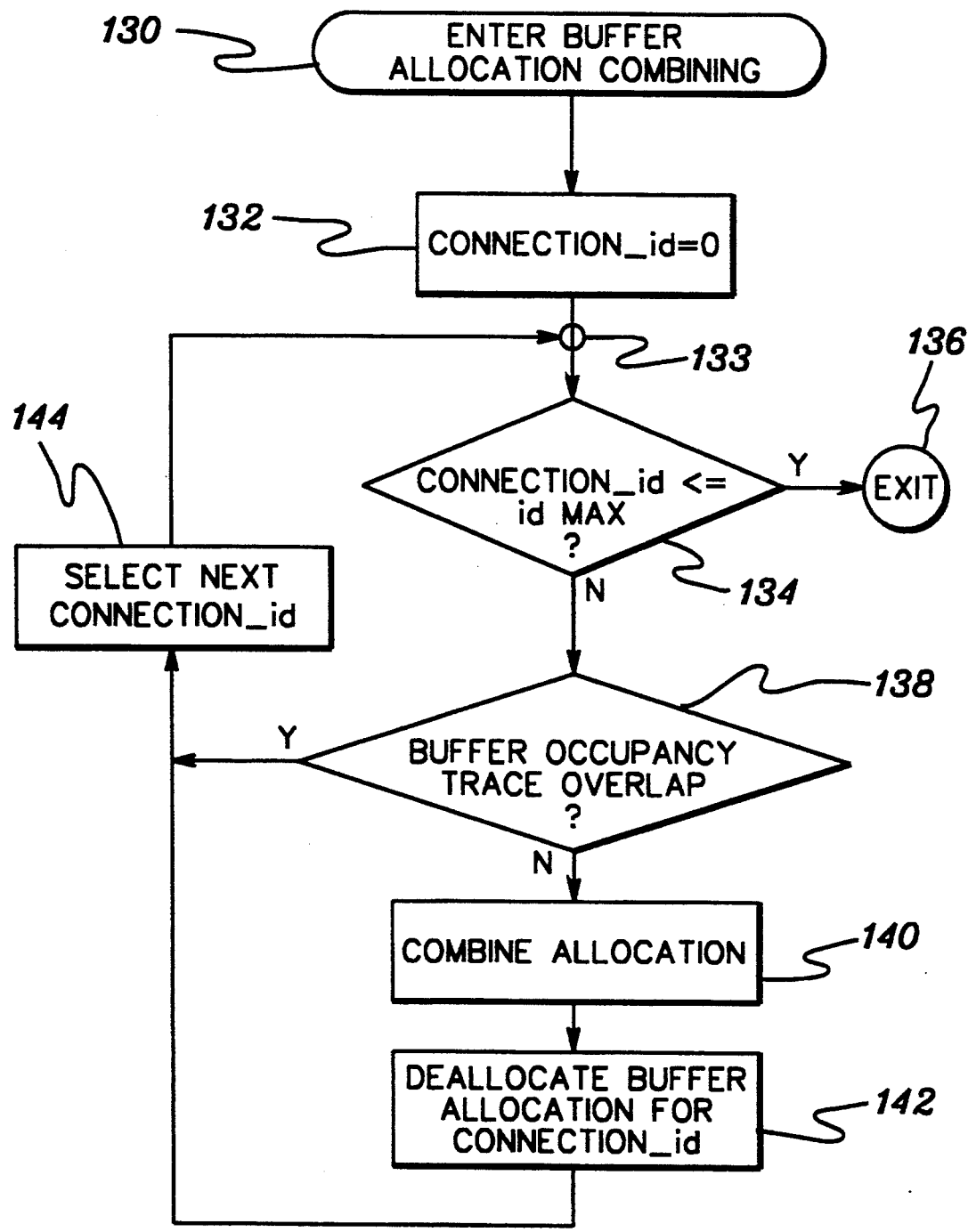
FIG. 10 is a flowchart of one embodiment of the buffer allocation combining function of the processing of FIG. 6.

Continuing with the processing of FIG. 9, after receiving a stabilization message, a switch node resets a "stabilizing min counter" and a "stabilizing max counter" 116 "Reset Stabilizing Min Counter, Reset Stabilizing Max Counter." With receipt of each packet, the max counter is incremented by one, 118 "Stabilizing Max Counter = Stabilizing Max Counter + 1 After Each Packet Is Sent." Upon incrementing the max counter, processing determines whether the stabilizing max counter is over a predefined threshold $\delta$, 120 "Stabilizing Max Counter > Threshold?" If "Yes," then stabilizing processing is considered complete, 122 "Enter STABLE State." Entering the stable state triggers the switch port to reallocate buffers as explained below in connection with FIG. 10. If the stabilizing max counter is less than the threshold, then the queuing delay difference between a recorded previous packet and a current packet is computed at the port control, 124 "Compute Queuing Delay Difference Between Packet Transmissions." If the difference is greater than a predefined threshold, 126 "Difference < Threshold?," then the stabilizing max counter is again incremented and processing returns to inquiry 120. Otherwise, the STABLE state is entered where buffer allocation is considered.

As shown in FIG. 10, buffer reallocation begins, 130 "Enter Buffer Allocation Combining," with selection of a particular isochronous connection through the switch port, 132 "Connection_id=0." The port control or "scheduler" within each switch port will examine the buffer occupancy trace of all active isochronous connections. Selection of a first isochronous connection is arbitrary. After selecting a connection, processing determines whether all isochronous connections have been examined, 134 "Connection_id ≦ id Max?" If "Yes," then reallocation combining is complete and processing is terminated, 136 "Exit." Otherwise, analysis is conducted to determine whether there is buffer occupancy trace overlap, 138 "Buffer Occupancy Trace Overlap?"

The buffer allocation of a particular isochronous connection is combined with other isochronous connections by the scheduler only if the buffer occupancy traces for these isochronous connections do not overlap in time. Further, the combining process can only occur after a stabilization message has been received and the isochronous circuit through the switch port has itself stabilized. The resultant buffer allocation is proportional to the average $T_{delay}$. Assuming that there is no overlap, then buffer allocations are combined, 140 "Combine Allocation," and the buffer allocation for one of the two merged connections is deallocated, 142 "Deallocate Buffer Allocation for Connection_id." A next isochronous connection is then selected, 144 "Select Next Connection_id," and processing returns to junction 133 and hence inquiry 134.

An assumption in the above discussion is that there is a real time clock inside each switch port to provide the time stamp service for $T_{delay}$, $T_{delivery}$ and $T_{arrival}$. With the feedback mechanism, it is feasible for several isochronous connections to share the same buffer, as long as there is sufficient guard time between the arrival of packets belonging to different isochronous connections. A minimum guard time required for two isochronous connections to share the same buffer would be $T_{delay}$, i.e., the delay of the packet delivery for the first isochronous connection. Sharing of buffers among isochronous and anisochronous traffic is not allowed since there is no timing relationship between them and buffer overflow would occur. In an ideal situation, the value of $T_{delay}$ reduces to zero, which results in ideal time division mutliplexing and negligible buffer occupancy.

As a summary overview, feedback processing in accordance with the invention employs the following steps:

1. Perform buffer allocation at the beginning of an isochronous connection to ensure lossless transmission.
2. Record the buffer occupancy trace of each isochronous connection.
3. Return the queuing delay of an isochronous packet at a switch port to its preceding switch stage.
4. At the preceding switch stage, adjust the delivery time according to this feedback packet so that the queuing time of the following stage is reduced.
5. After the initial feedback and delivery time adjustment, the delay of the packets of each isochronous connection passing through a switch port stabilize. Stabilization of the delay is reached at each switch port when no feedback frame is sent for a certain period of time (which can be measured by packet transmission).
6. A stabilization message is initialized at the destination port as soon as an isochronous circuit is established. This stabilization message is passed back along the isochronous connection by each switch stage if and only if the switch stage is stabilized.
7. Once a switch stage has received a stabilization message and has itself stabilized, a scheduler of the switch can decide whether to reallocate buffers to different isochronous circuits, as long as their buffer occupancy traces do not overlap.

It will be understood by those skilled in that a feedback mechanism is presented herein to reduce the average buffer occupancy for isochronous traffic in a packet switch network, and thereby increase overall switch throughput. Enhanced performance is obtained without requiring global synchronization. This is particularly important as the frequency of operation of communication systems continues to increase and the ability to globally synchronize remains limited. The approach presented minimizes buffering of packets once launched into the packet switch network and thereby reduces the amount of unpredictable delay within the network. Further, by combining buffer allocations of different isochronous connections, a packet switch network can accommodate a greater number of isochronous connections without requiring a commensurate increase in buffering capacity.

Although specific embodiments of the present invention have been illustrated in the accompanying drawings and described in the foregoing detailed description, it will be understood that the invention is not limited to the particular embodiments described herein but is capable of numerous rearrangements, modifications and substitutions without departing from the scope of the invention. The following claims are intended to encompass all such modifications.

We claim:

1. A method for processing an isochronous connection established within a multinode packet switch network having at least two isochronous connections through a common switch port, each of said at least two isochronous connections having stream of packets propagating therethrough, said streams of packets each having a fixed packet phase and a same nearly constant packet rate, $1/T_{frame}$, into the common switch port, said at least two isochronous connections comprising a first isochronous connection and a second isochronous connection, said processing method comprising the steps of:
   (a) monitoring buffer occupancy time of a current packet in the stream of packets provided to the common switch port by the first isochronous connection;
   (b) returning a feedback message along the first isochronous connection to a previous switch node of the multinode packet switch network, said feedback message being representative of the buffer occupancy time monitored in said step (a); and
   (c) adjusting at the previous switch node the packet phase of subsequent packets relative to the nearly constant packet rate $1/T_{frame}$ of the stream of packets propagating through the first isochronous connection to the common switch port such that once delivered to the common switch port, buffer occupancy time for the subsequent packets is reduced in comparison with buffer occupancy time of the current packet monitored in said step (a).

2. The processing method of claim 1, further comprising the step of initially allocating to each of said at least two isochronous connections at least one buffer at the common switch port, said at least one buffer allocation to each isochronous connection being sufficient to retain a packet of the stream packets provided through the corresponding isochronous connection.

3. The processing method of claim 2, further comprising the step of repeating steps (a)-(c) for a plurality of current packets of the stream of packets propagated to the common switch port through the first isochronous connection.

4. The processing method of claim 3, further comprising the step of discontinuing said repeating of said steps (a)-(c) once monitored buffer occupancy time for successive packets of the stream of packets provided to the common switch port through the first isochronous connection stabilizes.

5. The processing method of claim 4, further comprising the steps of:
   monitoring buffer occupancy time of a packet in the stream of packets delivered to the common switch port through the second isochronous connection; and
   combining buffer allocations for the first isochronous connection and the second isochronous connection such that the at least two isochronous connections share a buffer at the common switch port when there is no overlap in monitored buffer occupancy time for the phase adjusted subsequent packets of the first isochronous connection and the packet of the second isochronous connection undergoing buffer occupancy monitoring.

6. The processing method of claim 5, further comprising the step of deallocating at least one buffer initially allocated to the first isochronous connection and the second isochronous connection whenever the at least two isochronous connections are combined such that a buffer is shared at the common switch port.

7. The processing method of claim 4, wherein said discontinuing step comprises discontinuing said repeating of said steps (a)-(c) once monitored buffer occupancy time between packets of the stream of packets provided through the first isochronous connection to the common switch port stabilizes at a value less than or equal to a predefined value $\epsilon$.

8. The processing method of claim 4, wherein said discontinuing step comprises discontinuing said repeating of said steps (a)-(c) after N packets of the stream of packets provided through the first isochronous connection to the common switch port have undergone said buffer occupancy time monitoring of step (a) with corresponding feedback messages having been sent to the previous switch node for each of the N packets (wherein N=an integer number).

9. The processing method of claim 1, further comprising the step of establishing a new isochronous connection within the multinode packet switch network, and wherein said processing method includes repeating said steps (a)-(c) for the new isochronous connection.

10. The processing method of claim 1, wherein said first isochronous connection is established through a plurality of switch ports and wherein said processing method includes performing steps (a)-(c) for at least some of said plurality switch ports through which the first isochronous connection is established.

11. The processing method of claim 1, wherein said adjusting step (c) includes adjusting at the previous switch node the packet phase of subsequent packets relative to the nearly constant packet rate $1/T_{frame}$ of the stream of packets propagating through the first isochronous connection to the common switch port such that delivery of the subsequent packets is delayed by an amount less than or equal to the buffer occupancy time monitored in said step (a).

12. In a packet switch network having an isochronous connection established through a first node and a second node such that a stream of packets is delivered from the first node to the second node at a nearly constant packet rate, $1/T_{frame}$, and packet phase, a method for reducing buffer occupancy time of packets delivered to the second node without affecting the nearly constant packet rated $1/T_{frame}$, said method comprising the steps of:
   (a) monitoring buffer occupancy time at the second node of a current packet of the stream of packets delivered from the first node to the second node;
   (b) generating at the second node a feedback message representative of the buffer occupancy time monitored in said step (a);
   (c) sending the feedback message back along the isochronous connection from the second node to the first node; and
   (d) adjusting at the first node the packet phase of subsequent packets of the stream of packets relative to the nearly constant packet rate $1/T_{frame}$ without effecting the nearly constant packet rate $1/T_{frame}$ such that once delivered to the second node, buffer occupancy time for the subsequent packets is reduced in comparison with buffer occupancy time of the current packet monitored in said step (a).

13. The method of claim 12, further comprising the step of repeating steps (a)–(d) for a plurality of packets of the stream of packets delivered from the first node to the second node.

14. The method of claim 13, further comprising the step of discontinuing said repeating of said steps (a)–(d) once monitored buffer occupancy time for at least some packets of the stream of packets has stabilized below a predefined value $\epsilon$.

15. The method of claim 12, wherein said adjusting step (d) includes adjusting at the first node the packet phase of subsequent packets of the stream of packets relative to the nearly constant packet rate $1/T_{frame}$ such that the subsequent packets are delayed in time by an amount equal to or less than the buffer occupancy time monitored in said step (a) without affecting the nearly constant packet rate $1/T_{frame}$.

16. A method for processing at least two isochronous connections established within a multinode packet switch network, said at least two isochronous connections including a first isochronous connection and a second isochronous connection which share a common switch port at a switch node of the multinode packet switch network, said at least two isochronous connections each providing a stream of packets to the common switch port, said streams of packets having the same nearly constant packet rate, $1/T_{frame}$, and independent packet phases, each of the at least two isochronous connection having a unique buffer allocation at the common switch port, said processing method comprising the steps of:
(a) evaluating buffer occupancy time relative to said packet rate $1/T_{frame}$ of at least one packet in the stream of packets provided through the first isochronous connection to the common switch port, and evaluating buffer occupancy time relative to said packet rate $1/T_{frame}$ of at least one packet in the stream of packets provided through the second isochronous connection to the common switch port; and
(b) combining buffer allocations for the first isochronous connection and the second isochronous connection such that the at least two isochronous connections share a buffer at the common switch node provided that there is no overlap in evaluated buffer occupancy times for the at least one packet of the first isochronous connection and the at least one packet of the second isochronous connection.

17. The processing method of claim 16, further comprising the step of initially allocating to each of said at least two isochronous connections the unique buffer allocation at the common switch port, said unique buffer allocation to each isochronous connection being sufficient to retain a packet of the stream of packets propagated through the corresponding connection.

18. The processing method of claim 17, wherein said step (a) includes recording buffer occupancy time for the at least one packet of the first isochronous connection and the at least one packet of the second isochronous connection in a buffer occupancy trace table.

19. The processing method of claim 16, further comprising the step of deallocating the unique buffer allocation for one of said at least two isochronous connections after combining buffer allocations in said step (b).

20. A multinode packet switch network having an established isochronous connection wherein a stream of packets propagates through the network at a nearly constant packet rate, $1/T_{frame}$, and packet phase, said packet switch network comprising:
a first switch node and a second switch node through which the isochronous connection is established and the stream of packets propagates, said first switch node delivering the stream of packets to the second switch node at said nearly constant packet rate, $1/T_{frame}$, said second switch node including a buffer for temporarily retaining a current packet of the stream of packets;
means for monitoring buffer occupancy time at the second switch node of the current packet of the stream of packets delivered from the first switch node to the second switch node;
means for generating at the second switch node a feedback message representative of the monitored buffer occupancy time;
means for sending the feedback message from the second switch node to the first switch node; and
means for adjusting at the first switch node the packet phase of subsequent packets of the stream of packets relative to the nearly constant packet rate $1/T_{frame}$ without affecting the nearly constant packet rate $1/T_{frame}$ such that once delivered to the second switch node, buffer occupancy time for the subsequent packets is reduced in comparison with the monitored buffer occupancy time.

21. The packet switch network of claim 20, wherein said means for adjusting includes means for adjusting at the first switch node the packet phase of subsequent packets of the stream of packets relative to the nearly constant packet rate $1/T_{frame}$ without affecting the nearly constant packet rate $1/T_{frame}$ and such that the subsequent packets are delayed by an amount less than or equal to the monitored buffer occupancy time.

22. A multinode packet switch network having at least two isochronous connections established through a common switch port, each of said at least two isochronous connections having a stream of packets propagating therethrough, said streams of packets each having a fixed packet phase and a same nearly constant packet rate, $1/T_{frame}$ into the common switch port, said at least two isochronous connections comprising a first isochronous connection and a second isochronous connection, said multinode packet switch network comprising:
means for monitoring buffer occupancy time of a current packet in the stream of packets provided to the common switch port by the first isochronous connection;
means for returning a feedback message along the first isochronous connection to a previous switch node of the multinode packet switch network, said feedback message being representative of the monitored buffer occupancy time; and
means for adjusting at the previous switch node the packet phase of subsequent packets relative to the nearly constant packet rate $1/T_{frame}$ of the stream of packets propagating through the first isochronous connection without affecting the nearly constant packet rate $1/T_{frame}$ and such that once delivered to the common switch port buffer occupancy time for the subsequent packets is reduced in comparison with the monitored buffer occupancy time of the current packet.

23. The multinode packet switch network of claim 22, further comprising:

means for monitoring buffer occupancy time of a packet in the stream of packets delivered to the common switch port through the second isochronous connection; and means for combining buffer allocations of the first isochronous connection and the second isochronous connection such that the at least two isochronous connections share a buffer at the common switch node when there is no overlap in monitored buffer occupancy time for the phase adjusted subsequent packets of the first isochronous connection and the packet of the second isochronous connection undergoing buffer occupancy monitoring.

24. The multinode packet switch network of claim 22, wherein said means for adjusting the packet phase at the previous switch node includes means for adjusting the packet phase of subsequent packets relative to the nearly constant packet rate $1/T_{frame}$ of the stream of packets propagating through the first isochronous connection without affecting the nearly constant packet rate $1/T_{frame}$ and such that the subsequent packets are delayed in time by an amount less than or equal to the monitored buffer occupancy time for the current packet.

25. A multinode packet switch network having at least two isochronous connections which share a common switch port at a switch node of the multinode packet switch network, said at least two isochronous connections each providing a stream of packets to the common switch port, said streams of packets having the same nearly constant packet rate, $1/T_{frame}$, and independent packet phases, each of the at least two isochronous connections having a unique buffer allocation at the common switch port, said at least two isochronous connections including a first isochronous connection and a second isochronous connection, said multinode packet switch network comprising:

means for evaluating buffer occupancy time relative to the packet rate $1/T_{frame}$ of at least one packet in the stream of packets provided through the first isochronous connection to the common switch port;

means for evaluating buffer occupancy time relative to the packet rate $1/T_{frame}$ of at least one packet in the stream of packets provided through the second isochronous connection to the common switch port; and means for combining buffer allocations for the first isochronous connection and the second isochronous connection such that the at least two isochronous connections share a buffer at the common switch port provided that there is no overlapping in evaluated buffer occupancy times for the at least one packet of the first isochronous connection and the at least one packet of the second isochronous connection.

26. The multinode packet switch network of claim 25, further comprising means for recording buffer occupancy time for the at least one packet of the first isochronous connection and the at least packet of the second isochronous connection, said means for recording buffer occupancy time including means for storing buffer occupancy times in a buffer occupancy trace table.

27. The multinode packet switch network of claim 25, wherein said means for combining buffer allocations includes means for deallocating the unique buffer allocation for one of the at least two isochronous connections after combining buffer allocations.

* * * * *